J. H. RICE.
Cultivator.

No. 159,842. Patented Feb. 16, 1875.

Witnesses:
P. C. Dieterich
W. C. McArthur

Inventor:
John H. Rice per C. H. Watson & Co.
Attorneys.

UNITED STATES PATENT OFFICE.

JOHN H. RICE, OF KEITHSBURG, ILLINOIS.

IMPROVEMENT IN CULTIVATORS.

Specification forming part of Letters Patent No. 159,842, dated February 16, 1875; application filed December 29, 1874.

*To all whom it may concern:*

Be it known that I, JOHN H. RICE, of Keithsburg, in the county of Mercer and State of Illinois, have invented certain new and useful Improvements in Cultivators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a cultivator which shall be of light draft, easily managed and easily cleaned, and which will not jump over clods, but be effective in operation.

Figure 1:
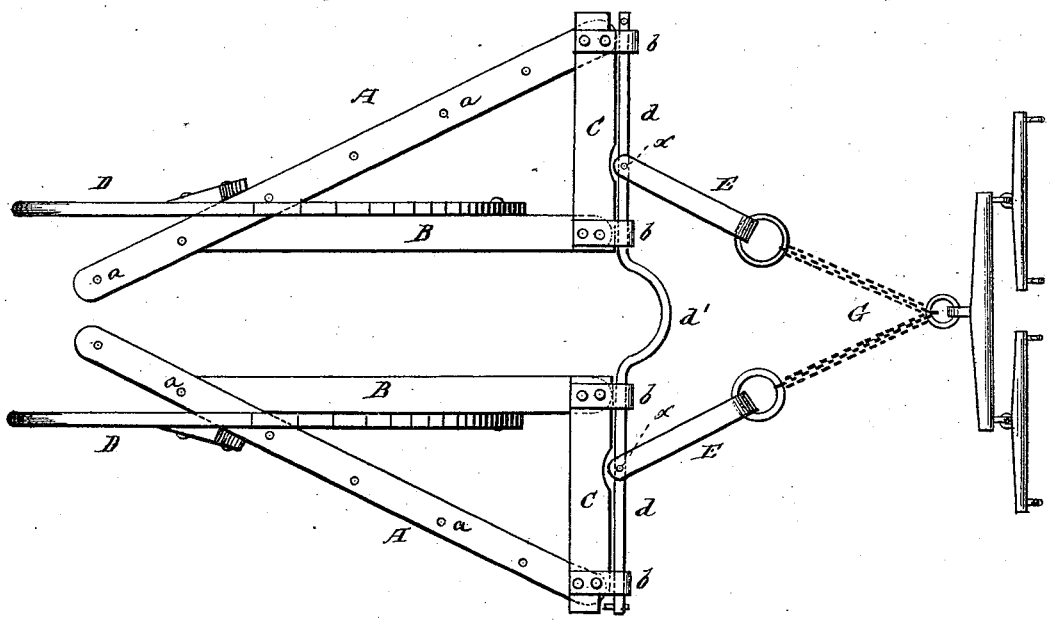
Figure 2:
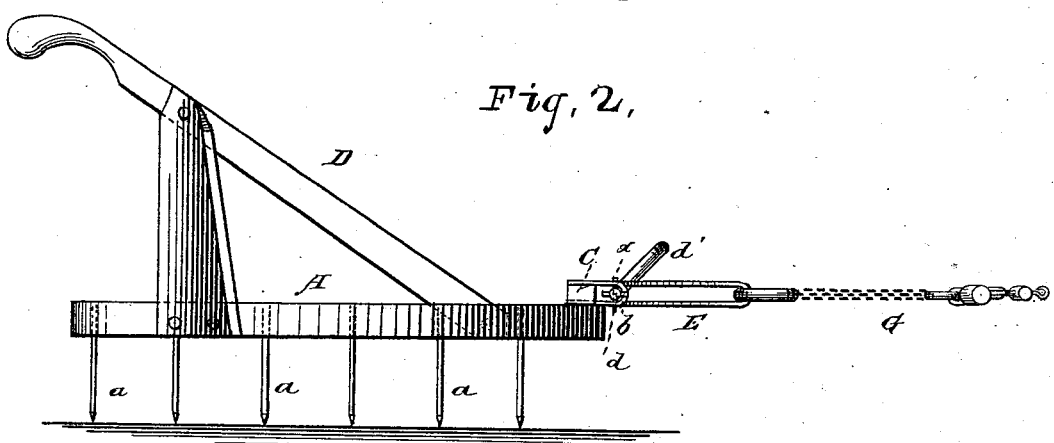

In the annexed drawings, Figure 1 represents a plan view, and Fig. 2 a side elevation.

My cultivator is composed of two frames, each frame consisting of an outer inclined beam, A, to which the teeth $a$ $a$ are secured, and an inner beam, B, parallel with the line of the draft, the front ends of the two beams being connected by a cross-bar, C, placed on top thereof, or otherwise, as desired. To the front edge of each cross-bar C are attached suitable boxes or bearings $b$ $b$, in which is placed a rod, $d$, the center of which, between the two frames, is curved upward, forming the arch $d'$. When thus connected with each other, the beams B B of the two frames run parallel with each other. D D are the handles of the cultivator, suitably attached and braced to the two frames. E E represent two elongated or stretcher clevises, the rear ends of which are attached to the ends of the rod $d$ at points a little outside of the front ends of the parallel beams B B, and the connections are formed by pins $x$ $x$ passing through the clevises and the rod, as shown.

The front ends of the clevises are connected by a chain, G, in the center of which the team is attached by the usual double and single trees.

It will readily be seen that when the cultivator is in motion, the pins $xx$, connecting the clevises E and rod $d$, will hold said rod in such a position that the arch $d$ will be upward, and cannot get in any other position as long as the team is pulling, thus preventing any injury to the plants, as they will pass under the arch.

By the construction of the frames and the connection of the clevises at the points mentioned, it will be seen the draft is equally from the rear of the frames as at the front, thus making the draft light, and rendering the implement easily handled. By the use of the two bearing-points on the forward part of each frame A B, and connecting the pivoted clevises E near the center of the rod $d$, the draft is always in a direct forward line, and the frames may thus be angular, covering a large space of ground with a simple means, and embracing all the advantages of this class of devices. By the elongated clevises and the chain connecting them, a perfect equalizer is obtained, as, no matter which horse starts first, or which horse pulls most, both frames will be equally operated upon. This cultivator or harrow is simple in construction, can be easily and cheaply manufactured, and is effective and durable in operation.

Having thus fully described my invention, what I claim as new, and desire to secure by Letters Patent, is—

The angular frames A B C, carrying handles D, in combination with the arched rod $d$, having two bearings, $b$, upon each frame, and the pivoted bars E and draft device, all constructed as and for the purpose herein specified.

In testimony that I claim the foregoing as my own I affix my signature in presence of two witnesses.

JOHN H. RICE.

Witnesses:
J. H. JENINGS,
JAS. A. CASWELL.